US009674261B2

(12) United States Patent
Nathan et al.

(10) Patent No.: US 9,674,261 B2
(45) Date of Patent: Jun. 6, 2017

(54) ODBC ACCESS TO EXTERNAL SERVICES

(71) Applicants: Eyal Nathan, Reut (IL); Dmitry Khalatov, Yokneam-Illit (IL)

(72) Inventors: Eyal Nathan, Reut (IL); Dmitry Khalatov, Yokneam-Illit (IL)

(73) Assignee: SAP Portals Israel Ltd., Ra'anana (IL)

( * ) Notice: Subject to any disclaimer, the term of this patent is extended or adjusted under 35 U.S.C. 154(b) by 394 days.

(21) Appl. No.: 14/300,777

(22) Filed: Jun. 10, 2014

(65) Prior Publication Data
US 2015/0358383 A1  Dec. 10, 2015

(51) Int. Cl.
G06F 17/30 (2006.01)
H04L 29/08 (2006.01)

(52) U.S. Cl.
CPC ........ H04L 67/02 (2013.01); G06F 17/30882 (2013.01)

(58) Field of Classification Search
USPC ................................ 707/759–760, 763, 769
See application file for complete search history.

(56) References Cited

U.S. PATENT DOCUMENTS

| | | | | |
|---|---|---|---|---|
| 5,742,845 A * | 4/1998 | Wagner | ..................... | G06F 8/33 705/26.1 |
| 6,016,499 A * | 1/2000 | Ferguson | .......... | G06F 17/30569 |
| 6,356,920 B1 * | 3/2002 | Vandersluis | ...... | G06F 17/30389 707/E17.125 |
| 6,363,391 B1 * | 3/2002 | Rosensteel, Jr. | ..... | G06F 17/3056 |
| 6,591,272 B1 * | 7/2003 | Williams | .......... | G06F 17/30607 |
| 6,807,572 B1 * | 10/2004 | Yu | ..................... | G06F 17/30893 707/E17.117 |
| 6,901,428 B1 * | 5/2005 | Frazier | .............. | G06F 17/30905 707/999.009 |
| 6,907,401 B1 * | 6/2005 | Vittal | ..................... | G06Q 30/06 705/26.2 |
| 6,920,461 B2 * | 7/2005 | Hejlsberg | .................. | G06F 9/46 |
| 7,107,279 B2 * | 9/2006 | Pociu | ........................ | G06F 8/20 |
| 7,249,356 B1 * | 7/2007 | Wilson | ............. | G05B 19/41865 700/17 |
| 7,523,191 B1 * | 4/2009 | Thomas | .............. | G06F 11/3438 709/202 |

(Continued)

OTHER PUBLICATIONS

U.S. Appl. No. 13/732,792, filed Jan. 2, 2013, Lehmann et al.
(Continued)

*Primary Examiner* — Hanh Thai
(74) *Attorney, Agent, or Firm* — Fish & Richardson P.C.

(57) ABSTRACT

The present disclosure involves systems, software, and computer implemented methods for providing access to an external service using a SQL query. One example method includes identifying a request for an ODBC (Open DataBase Connectivity) connection. The request identifies the external service and the identified request is associated with a SQL (Structured Query Language) query. The ODBC connection is created. An HTTP (Hyper Text Transfer Protocol) request to be provided to the external service is generated. The HTTP request is generated based on the SQL query. The generated HTTP request is sent to the external service. An HTTP response is received from the external service in response to the HTTP request. A query result set table is populated based on the received HTTP response.

17 Claims, 5 Drawing Sheets

(56) References Cited

U.S. PATENT DOCUMENTS

| | | | |
|---|---|---|---|
| 7,702,739 B1* | 4/2010 | Cheng | H04L 47/10 709/203 |
| 8,266,177 B1* | 9/2012 | Seymour | G06F 17/30991 707/783 |
| 8,489,561 B1 | 7/2013 | Nathan et al. | |
| 8,959,110 B2* | 2/2015 | Smith | G06F 17/30545 707/770 |
| 2002/0143816 A1* | 10/2002 | Geiger | G06F 17/30569 715/239 |
| 2003/0041052 A1* | 2/2003 | Gajda | G06F 17/3041 |
| 2003/0151633 A1* | 8/2003 | George | G06F 17/3056 715/864 |
| 2004/0006574 A1* | 1/2004 | Witkowski | G06F 17/30333 |
| 2004/0015504 A1* | 1/2004 | Ahad | G06F 17/3048 |
| 2004/0030739 A1* | 2/2004 | Yousefi'zadeh | G06F 17/30545 709/201 |
| 2004/0034616 A1* | 2/2004 | Witkowski | G06F 17/30592 |
| 2004/0193703 A1* | 9/2004 | Loewy | H04L 41/0893 709/220 |
| 2006/0004745 A1* | 1/2006 | Kuhn | G06Q 10/10 |
| 2007/0094289 A1* | 4/2007 | Vandersluis | G06F 17/2229 |
| 2007/0097996 A1* | 5/2007 | Millefiorini | G06Q 10/06311 370/401 |
| 2007/0118648 A1* | 5/2007 | Millefiorini | H04L 63/08 709/225 |
| 2007/0294214 A1* | 12/2007 | Santosuosso | G06F 17/30477 |
| 2007/0299822 A1* | 12/2007 | Jopp | G06F 17/3056 |
| 2008/0066019 A1* | 3/2008 | Worek | G05B 19/4183 700/17 |
| 2008/0140696 A1* | 6/2008 | Mathuria | G06F 17/30315 |
| 2008/0313660 A1* | 12/2008 | Malik | G06F 9/547 719/330 |
| 2009/0210360 A1* | 8/2009 | Sankar | G06F 9/44505 706/10 |
| 2011/0040747 A1* | 2/2011 | Brad | G06F 17/30914 707/722 |
| 2011/0213766 A1* | 9/2011 | Hong | G06F 17/30312 707/718 |
| 2011/0276636 A1* | 11/2011 | Cheng | H04L 69/14 709/206 |
| 2011/0321010 A1* | 12/2011 | Wang | G06F 9/443 717/116 |
| 2012/0089612 A1* | 4/2012 | Collins | H04N 1/00244 707/747 |
| 2013/0018839 A1* | 1/2013 | Adendorff | G06F 17/3056 707/600 |
| 2013/0086483 A1 | 4/2013 | Vainer et al. | |
| 2013/0086495 A1 | 4/2013 | Guzansky et al. | |
| 2013/0091132 A1 | 4/2013 | Khalatov et al. | |
| 2013/0091456 A1 | 4/2013 | Sherman et al. | |
| 2013/0117256 A1* | 5/2013 | Gu | G06F 17/30424 707/718 |
| 2013/0159926 A1 | 6/2013 | Vainer et al. | |
| 2013/0166678 A1 | 6/2013 | Barak et al. | |
| 2013/0205028 A1* | 8/2013 | Crockett | G06F 9/5027 709/226 |
| 2013/0283146 A1 | 10/2013 | Barak et al. | |
| 2014/0046910 A1 | 2/2014 | Nathan et al. | |
| 2014/0059144 A1 | 2/2014 | Lehmann et al. | |
| 2014/0068545 A1 | 3/2014 | Lehmann et al. | |
| 2014/0101280 A1* | 4/2014 | Schmidt | H04L 67/02 709/217 |
| 2014/0108474 A1* | 4/2014 | David | G06F 17/30 707/827 |
| 2015/0222604 A1* | 8/2015 | Ylonen | H04L 63/062 713/171 |

OTHER PUBLICATIONS

U.S. Appl. No. 13/740,858, filed Jan. 14, 2013, Nathan et al.
U.S. Appl. No. 13/904,544, filed May 29, 2013, Lehmann et al.
U.S. Appl. No. 13/916,857, filed Jun. 13, 2013, Lehmann et al.
U.S. Appl. No. 13/943,581, filed Jul. 16, 2013, Lehmann et al.
U.S. Appl. No. 13/970,977, filed Aug. 20, 2013, Nathan et al.
U.S. Appl. No. 14/035,038, filed Sep. 24, 2013, Sherman et al.
U.S. Appl. No. 14/040,932, filed Sep. 30, 2013, Shoshin et al.
U.S. Appl. No. 14/044,555, filed Oct. 2, 2013, Ebner et al.

* cited by examiner

| HTTP TABLE COLUMNS | |
|---|---|
| METHOD | 302 |
| PATH | 304 |
| QUERY | 306 |
| REQ_HEADERS | 316 |
| REQ_BODY | 305 |
| STATUS | 318 |
| RESP_BODY | 320 |
| RESP_HEADERS | 330 |
| REQ_CONTENT_TYPE | 308 |
| REQ_CONTENT_ENCODING | 310 |
| REQ_COOKIE | 312 |
| REQ_ACCEPT | 314 |
| RESP_CONTENT_TYPE | 322 |
| RESP_CONTENT_ENCODING | 324 |
| RESP_CACHE_CONTROL | 326 |
| RESP_EXPIRES | 328 |

ODBC ACCESS TO EXTERNAL SERVICES

TECHNICAL FIELD

The present disclosure relates to computer-implemented methods, software, and systems for providing access to an external service using a structured query language (SQL) query.

BACKGROUND

ODBC (Open Database Connectivity) is a programming language API (Application Programming Interface) for accessing database management systems (DBMSs). An application that has data access portions written using ODBC can be ported to other platforms with minor changes to the data access code. ODBC accomplishes DBMS portability by using an ODBC driver as a translation layer between the application and the DBMS.

The Hypertext Transfer Protocol (HTTP) is an application protocol for distributed information systems. HTTP uses a request-response protocol in a client-server computing model. A web browser, for example, may be a client and an application running on a server associated with a web site or web service may perform a role of a server. The client can submit an HTTP request message to the server and the server can return a response message to the client. The response can include status information about the request and may also include requested content in a message body.

SUMMARY

The present disclosure involves systems, software, and computer implemented methods for providing access to an external service using a SQL query. One example method includes identifying a request for an ODBC connection. The request identifies the external service and the identified request is associated with a SQL (Structured Query Language) query. The ODBC connection is created. An HTTP request to be provided to the external service is generated. The HTTP request is generated based on the SQL query. The generated HTTP request is sent to the external service. An HTTP response is received from the external service in response to the HTTP request. A query result set table is populated based on the received HTTP response.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

As compared to prior database systems, modern database systems can include more processing power (e.g., multiple processing cores) and more memory, for support of in-memory database operations and faster response times for queries. In response to improvements in database systems, applications can be written that are based on a two-tier architecture (e.g., client and database) rather than a three-tier architecture (e.g., client, application server, and database). In a two-tier architecture, the client can communicate directly with the database system (e.g., as compared to communicating indirectly with the database system through an application server). Using a two-tier architecture rather than a three-tier architecture can result in reduced complexity and reduced cost of ownership. A two-tier architecture can work well when data external to the application is stored in a database system and not in other external systems. However, for some applications implemented as a two-tier application, the application may be required to access external data, such as data exposed as HTTP-based web services.

An application can be configured to access the external data using SQL queries rather than using other tools, such as external application servers or proprietary tools. For example, the application can be configured to interface with an ODBC driver using SQL. The ODBC driver can, for example, expose HTTP entities such as requests, responses, and headers using a SQL schema. The ODBC driver can be configured as an HTTP client that can interface with the external service. The ODBC driver can submit an HTTP request to the external service on behalf of the application, receive an HTTP response from the external service, and map data included in the HTTP response to a query result set table that is provided to the application in response to the SQL query. In other words, the ODBC driver translates the SQL query into an HTTP request and translates the received HTTP response into a table structure that can be used by the submitter of the SQL query.

Figure 1:
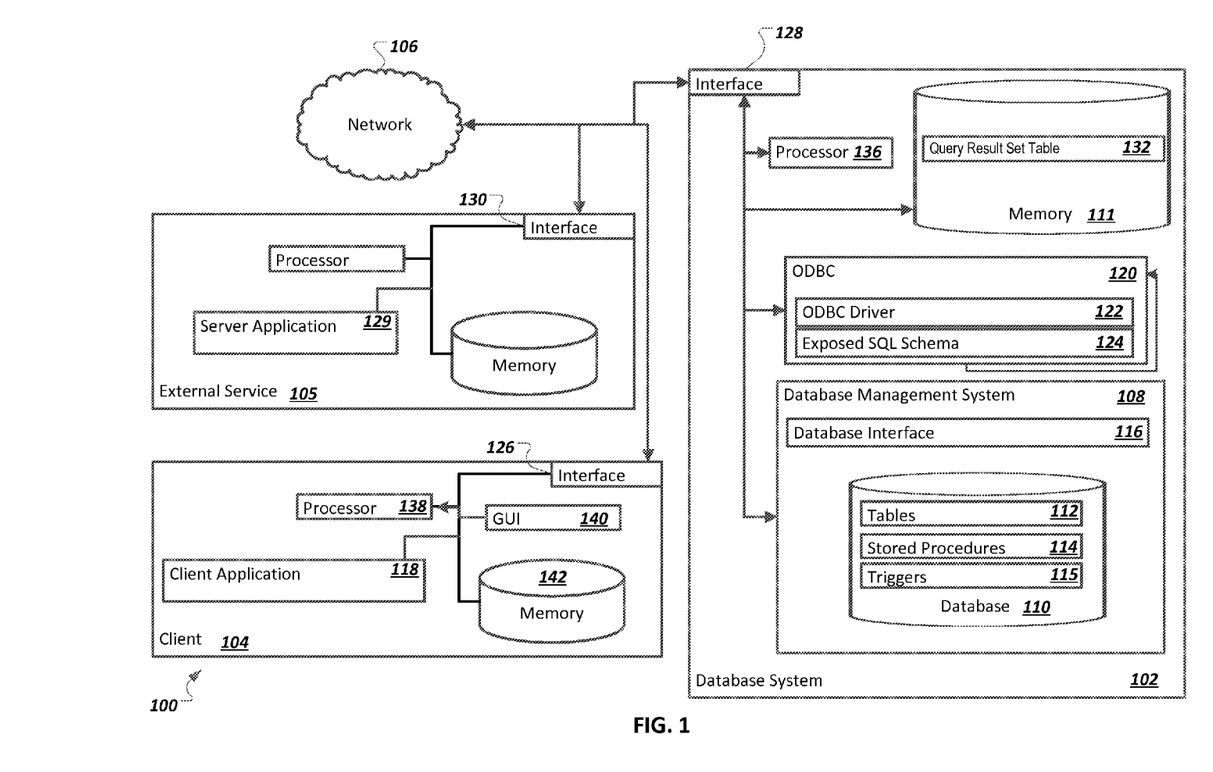
FIG. 1 is a block diagram illustrating an example system for providing access to external services.

FIG. 1 is a block diagram illustrating an example system 100 for providing access to external services. Specifically, the illustrated system 100 includes or is communicably coupled with a database system 102, a client device 104, an external service server 105, and a network 106. Although shown separately, in some implementations, functionality of two or more systems or servers may be provided by a single system or server. In some implementations, the functionality of one illustrated system or server may be provided by multiple systems or servers.

The database system 102 includes a database management system 108. The database management system 108 includes a database 110 which includes a set of tables 112 and other objects, such as a set of stored procedures 114 and a set of triggers 115. The database 110 can be, for example, a relational database or some other type of database. The database 110 can be an in-memory database (e.g., data associated with the database 110 may reside in memory 111). The database management system 108 also includes a database interface 116, which can be used, for example, by a client application 118 included in the client device 104, to interface with the database management system 108.

The database system 102 includes an ODBC system 120 which includes an ODBC driver 122. The ODBC driver 122 can be configured as an HTTP client that can interface with the external service server 105 (and with other external services). The ODBC driver 122 can, for example, expose HTTP entities such as requests, responses, and headers in an exposed SQL schema 124. The ODBC driver 122 can be configured to accept SQL queries using a standard version of SQL that is familiar to many database developers. The ODBC driver 122 can be implemented on database systems other than the database system 102. The ODBC driver 122 can be implemented on any database system (or other system or device) that implements the ODBC standard.

A developer of a trigger, a stored procedure, or the client application 118 may desire to implement the trigger, stored procedure, or the client application 118 to request execution of or obtain data from an external service, such as an external service provided by the external service server 105. For example, the external service server 105 can provide a web service that provides currency exchange rates that can be used, for example, to convert local currencies to another currency (e.g., United States dollars) before storing information for an order. As another example, the external service server 105 can provide (e.g., using one or more web services) contact information (e.g., phone number, email address) for a person entity in a business application, such as to a. processor of a pending travel expense approval request.

The trigger, stored procedure, or the client application 118 can be configured to access the external service indirectly, using the ODBC driver 122 and using a SQL query that complies with the exposed SQL schema 124. The trigger, stored procedure, or the client application 118 can be configured to request an ODBC connection with the ODBC driver 122, either before or in association with the providing of a SQL query to the ODBC driver 122. The request for the ODBC connection can include, for example, a connection string including one or more connection parameters for connecting to the external service. The ODBC driver 122 can be configured to return a connection object in response to the request for the ODBC connection. In some implementations, a trigger or stored procedure do not include code to request an ODBC connection but rather use (e.g., implicitly or explicitly) a previously-generated ODBC connection. For example, the database management system 108 can create and maintain an ODBC connection.

The client application 118 can send a SQL query (and/or a request for an ODBC connection) to the database system 102 using an interface 126. The database system 102 can receive the SQL query (and/or the request for the ODBC connection) using an interface 128. Alternatively, the client application 118 may initiate the SQL query via remote access to the database system 102.

The ODBC driver 122 can be configured to receive a SQL query (e.g., from the client application 118 or from an entity or object in the database system 102 in general (e.g., a server application or object) or in the database management system 108 in particular). For example, the ODBC driver 122 can receive a SQL query from a stored procedure included in the set of stored procedures 114 or a trigger included in the set of triggers 115.

A SQL query received by the ODBC driver can be configured to specify a set of HTTP request parameters, such as in a WHERE clause of the SQL query. The ODBC driver 122 can be configured to generate an HTTP request to be provided to the external service based on the received SQL query and the one or more connection parameters associated with the ODBC connection. The ODBC driver 122 can submit the generated HTTP request to the external service server 105 (e.g., using the interface 128).

In some implementations, the external service server 105 implements (e.g., provides) a web service. The external service server 105 can receive the HTTP request (e.g., using an interface 130). The external service server 105 is not aware that the received HTTP request is a translation of the SQL query. The received HTTP request is in a standard HTTP format (e.g., a same format used by other (e.g., web-based) clients of the external service server). The external service server 105 can process the received HTTP request (e.g., using a server application 129). The server application 129 can generate an HTTP response. The external service server 105 can send the generated HTTP response to the database system 102 (e.g., using the interface 130). The database system 102 can receive the HTTP response (e.g., using the interface 128). The HTTP response can be provided to the ODBC driver 122.

The ODBC driver 122 can populate a query result set table based on the received HTTP response. For example, a query result set table 132 in the memory 111 of the database system 102 can be populated. The query result set table 132 can be, for example, a runtime construct that is stored in the memory 111. To populate the query result set table 132, the ODBC driver 122 can map information included in the HTTP response to one or more columns included in the query result set table 132. The columns that are included in the query result set table 132 can be specified, for example, in a column list that is included in the SQL query received by the ODBC driver 122. The columns in the column list can be columns that are exposed by the exposed SQL schema 124.

The query result set table 132 (or a copy of the query result set table 132) can be provided to the submitter of the SQL query (e.g., the client application 118, a stored procedure in the set of stored procedures 114, or a trigger in the set of triggers 115). That is, the query result set table 132 can be provided as a query result of the submitted SQL query. The submitter of the SQL query can use the received copy of the query result set table 132 for further processing. For example, data of the copy of the query result set table 132 can be stored to a database system, such as the database management system 108 or some other database.

Data from a copy of the query result set table can be used, for example, by a trigger in the set of triggers 115. For example, the trigger can be configured to generate a SQL query in response to a trigger event that occurs in the database management system 108. The set of triggers 115 can include, for example, triggers that are executed in response to a new entry being added to the database 110, a modification of an entry in the database 110, or a deletion of an entry in the database 110. Additionally, triggers may occur based on events occurring outside of the database management system 108, such as events that may signal a change to the current values of one or more fields or entries within the database 110. Listening components (not shown) external to the database management system 108 may identify such an event and trigger an appropriate action within the database management system 108. The SQL query generated by a trigger can be configured to specify parameters for an HTTP request to be performed by the external service server 105 (or another server or service). The external service server 105 can, for example, in response to receiving the HTTP request sent by the ODBC driver on behalf of the trigger, perform some processing and return (in the HTTP response) a status code indicating a status of the processing. The trigger can be configured to store the status in an entry in the database 110 (e.g., in a table included in the set of tables 112). The trigger can be configured, for example, to include a nested query, with the SQL query provided to the ODBC driver as an innermost query and a second query, such as an UPDATE or INSERT query, as an outermost query. A nested query example is described in more detail below.

As used in the present disclosure, the term "computer" is intended to encompass any suitable processing device. For example, although FIG. 1 illustrates a single database system 102, a single client device 104, and a single external service server 105, the system 100 can be implemented using a single, stand-alone computing device, two or more database systems 102, two or more external service servers 105, or two or more clients 104. Indeed, the database system 102, the external service server 105, and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the database system 102, the external service server 105, and the client device 104 may be adapted to execute any operating system, including Linux, UNIX, Windows, Mac OS®, Java™, Android™, iOS or any other suitable operating system. According to one implementation, the database system 102 may also include or be communicably coupled with an e-mail server, a Web server, a caching server, a streaming data server, and/or other suitable server.

Interfaces 128, 126, and 130 are used by the database system 102, the external service server 105, and the client device 104, respectively, for communicating with other systems in a distributed environment—including within the system 100—connected to the network 106. Generally, the interfaces 128, 126, and 130 each comprise logic encoded in software and/or hardware in a suitable combination and operable to communicate with the network 106. More specifically, the interfaces 128, 126, and 130 may each comprise software supporting one or more communication protocols associated with communications such that the network 106 or interface's hardware is operable to communicate physical signals within and outside of the illustrated system 100.

The database system 102 includes one or more processors 136. Each processor 136 may be a central processing unit (CPU), a blade, an application specific integrated circuit (ASIC), a field-programmable gate array (FPGA), or another suitable component. Generally, each processor 136 executes instructions and manipulates data to perform the operations of the database system 102. Specifically, each processor 136 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The database system 102 includes the memory 111. In some implementations, the database system 102 includes multiple memories. The memory 111 may include any type of memory or database module and may take the form of volatile and/or non-volatile memory including, without limitation, magnetic media, optical media, random access memory (RAM), read-only memory (ROM), removable media, or any other suitable local or remote memory component. The memory 111 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the database system 102.

The client device 104 may generally be any computing device operable to connect to or communicate with the database system 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the application 118. A client application is any type of application that allows the client device 104 to request and view content on the client device 104. In some implementations, a client application can use parameters, metadata, and other information received at launch to access a particular set of data from the database system 102. In some instances, a client application may be an agent or client-side version of the one or more enterprise applications running on an enterprise server (not shown).

The client device 104 further includes one or more processors 138. Each processor 138 included in the client device 104 may be a central processing unit (CPU), an application specific integrated circuit (ASIC), a field-programmable gate array (FPGA), or another suitable component. Generally, each processor 138 included in the client device 104 executes instructions and manipulates data to perform the operations of the client device 104. Specifically, each processor 138 included in the client device 104 executes the functionality required to send requests to the database system 102 and to receive and process responses from the database system 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a graphical user interface (GUI) 140.

The GUI 140 of the client device 104 interfaces with at least a portion of the system 100 for any suitable purpose, including generating a visual representation of the client application 118. In particular, the GUI 140 may be used to view and navigate various Web pages. Generally, the GUI 140 provides the user with an efficient and user-friendly presentation of business data provided by or communicated within the system. The GUI 140 may comprise a plurality of customizable frames or views having interactive fields, pull-down lists, and buttons operated by the user. The GUI 140 contemplates any suitable graphical user interface, such as a combination of a generic web browser, intelligent engine, and command line interface (CLI) that processes information and efficiently presents the results to the user visually.

Memory 142 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 142 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the database system 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
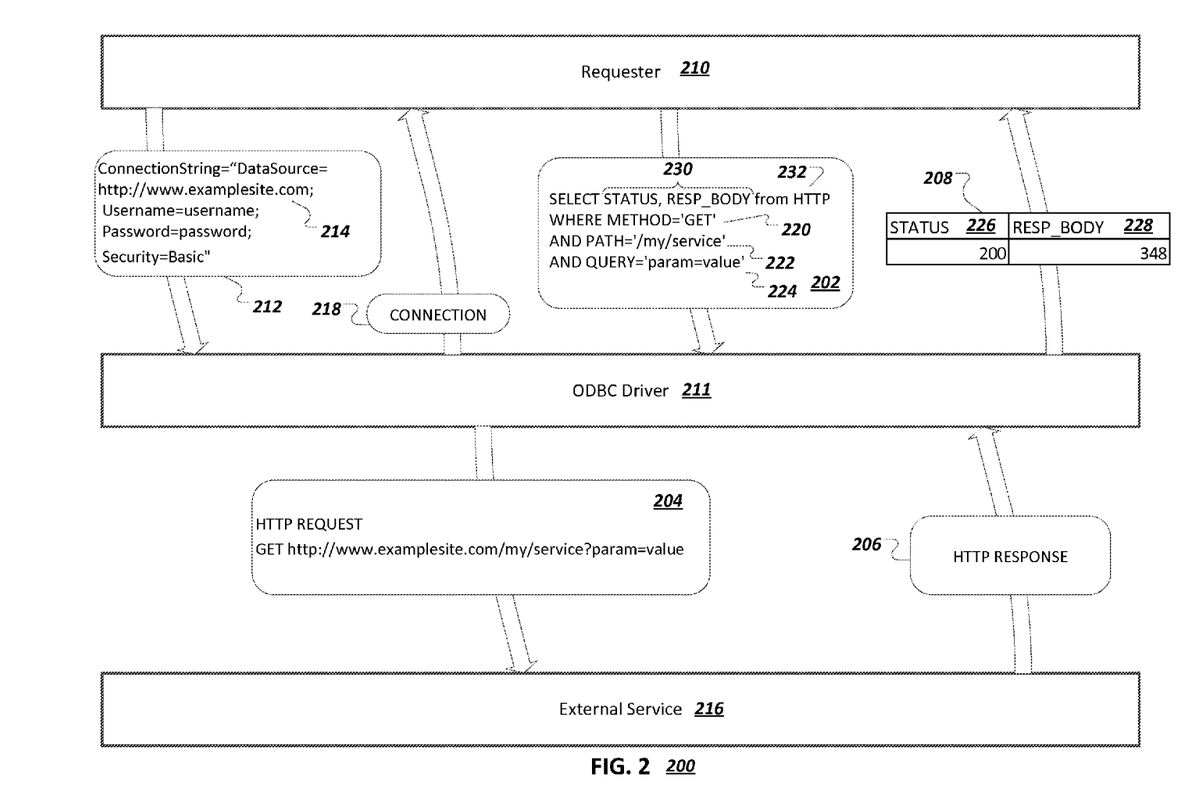
FIG. 2 illustrates translation of a SQL query into an HTTP request and an HTTP response into a query result set table.

FIG. 2 illustrates translation of a SQL query 202 into an HTTP request 204 and an HTTP response 206 into a query result set table 208. The SQL query 202 can be provided, for example, by a requester 210 to an ODBC driver 211. The requester 210 can be, for example, a client system or a component (e.g., a stored procedure) in a database system.

The requester 210 can, either before or in association with the providing of the SQL query 202, request a connection from the ODBC driver 211 by providing a connection request 212. The connection request 212 can include a connection string 214. The connection string 214 can include one or more connection parameters for connecting to an external service 216. For example, the connection string 214 includes a URL (Uniform Resource Locator) associated with the external service 216 and authentication information (e.g., user name, password) for accessing the external service 216. The ODBC driver 211 can identify the connection request 212. In some implementations, such as when the connection request 212 is sent separate from the SQL query 202, the ODBC driver 211 creates a connection and returns a connection object 218 to the requester 210. The requester 210 can use the connection object 218 to provide the SQL query 202 to the ODBC driver 211. In some instances, a connection may be maintained over a period of time or until a certain event, allowing for multiple queries to be used over a single connection.

The ODBC driver 211 can, in response to receiving the SQL query 202, generate the HTTP request 204 to be provided to the external service 216. The HTTP request 204 can be generated based on the SQL query 202 and on the connection string 214. For example, the HTTP request 204 can be associated with a URL that is based on the URL included in the connection string 214. The HTTP request 204 can be also based on information identified in one or more predicates included in a WHERE clause of the SQL query 202. For example, the WHERE clause of the SQL query 202 includes a first predicate 220 of "METHOD='GET'", a second predicate 222 of "PATH='/my/service'", and a third predicate 224 of "QUERY='param=value'". The ODBC driver 211 can use information included in the predicates 220, 222, and 224 to generate the HTTP request 204. For example, the HTTP request 204 can specify a method of "GET" as indicated by the first predicate 220. A URL associated with the HTTP request 204 can be based on a path specified in the second predicate 222, an external service parameter and associated value as specified in the third predicate 224, and connection parameter(s) included in the connection string 214. Although the third predicate 224 specifies one external service parameter, multiple external service parameters and associated values can be specified in a predicate.

The predicates 220, 222, and 224 each include a predefined column of a predefined table. A schema of the predefined table can be exposed, for example, by the ODBC driver 211. Each predefined column in the predefined table can correspond to either an HTTP request parameter or an HTTP response parameter. The predefined table is described in more detail below with respect to FIG. 3.

The ODBC driver 211 can send the HTTP request 204 to the external service 216. The external service 216 can process the HTTP request 204, generate the HTTP response 206, and provide the HTTP response 206 to the ODBC driver 211. The ODBC driver 211 can receive the HTTP response 206 and can populate the query result set table 208 based on the received HTTP response 206. For example, the ODBC driver 211 can map information included in the HTTP response 206 to one or more columns included in the query result set table 208.

For example, the query result set table 208 includes a "STATUS" column 226 and a "RESP_BODY" column 228. The columns 226 and 228 included in the query result set table 208 can be based off of columns included in the SQL query 202. For example, the SQL query 202 includes a "STATUS" column and a "RESP_BODY" column in a column list 230. In general, the columns included in the column list 230 and in the query result set table 208 (and the columns included in the predicates 220, 222, and 224) are included in a predefined table 220 (e.g., a predefined table named "HTTP", as described in more detail below with respect to FIG. 3).

The query result set table 208 is a runtime construct (e.g., a virtual table) that is initially stored in memory. The query result set table 208 is provided to the requester 210 in response to the SQL query 202. The requester 210 can use data in the query result set table 208 for further processing. For example, the requester 210 can store some or all of the data in the query result set table 208 in a database system.

Figure 3:
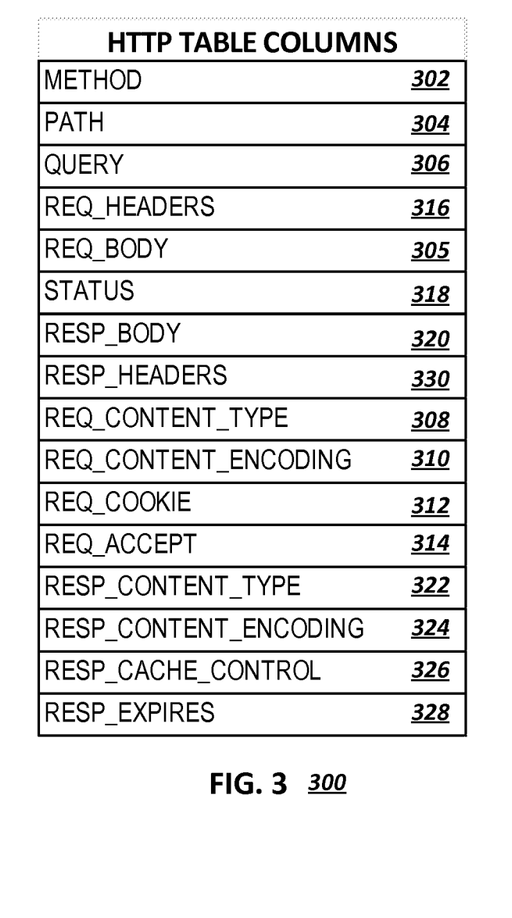
FIG. 3 illustrates an example schema used for SQL queries.

FIG. 3 illustrates an example schema 300 used for SQL queries. The schema 300 includes predefined columns that can be included in a SQL query that is provided to an ODBC driver and that can be included in a query result set table that is provided by the ODBC driver in response to the SQL query. Some columns included in the SQL query can be associated with request parameters to be included in an HTTP request sent by the ODBC driver to an external service in response to the ODBC driver receiving the SQL query. Columns that are associated with request parameters can be included, for example, in one or more predicates included in a WHERE clause of the SQL query.

For example, predicates that include a method column 302 or a path column 304 can be used when generating a first line (e.g., a request line) of the HTTP request. A REQ_BODY column 305 can be included in a predicate to specify a message body for the HTTP request. A query column 306 can be used in a predicate to specify a value to be provided to the external service for an external service parameter. Other columns, such as a REQ_CONTENT_TYPE column 308, a REQ_CONTENT_ENCODING column 310, a REQ_COOKIE column 312, and a REQ_ACCEPT column 314, can be used in a predicate for specifying a respective value to provide for a respective corresponding request header. A REQ_HEADERS column 316 can be used for specifying other request headers. For example, a REQ_HEADERS predicate included in the SQL query can include the REQ_HEADERS column 316 and a header/value list that includes one or more request-header/value pairs. The ODBC driver can generate an HTTP request and can set, in the HTTP request, each respective request header included in the header/value list to a respective, associated value.

Some columns included in the SQL query (e.g., in a column list) can be used for specifying response parameters to be returned by the ODBC driver. The ODBC driver can, for example, map content included in an HTTP response received from the external service to one or more columns included in a query result set table. For example, a STATUS column 318 included in the query result set table can include a status value indicating a status of processing of the HTTP request by the external service. A RESP_BODY column 320 included in the query result set table can include the body of the HTTP response. Columns RESP_CONTENT_TYPE 322, RESP_CONTENT_ENCODING 324, RESP_CACHE_CONTROL 326, and RESP_EXPIRES 328 can be included in the query result set table and can respectively include a value for a corresponding, respective HTTP response header. A RESP_HEADERS column 330 included in the query result set table can include values (e.g., in a header/value pair list) of other response headers.

Figure 4A:
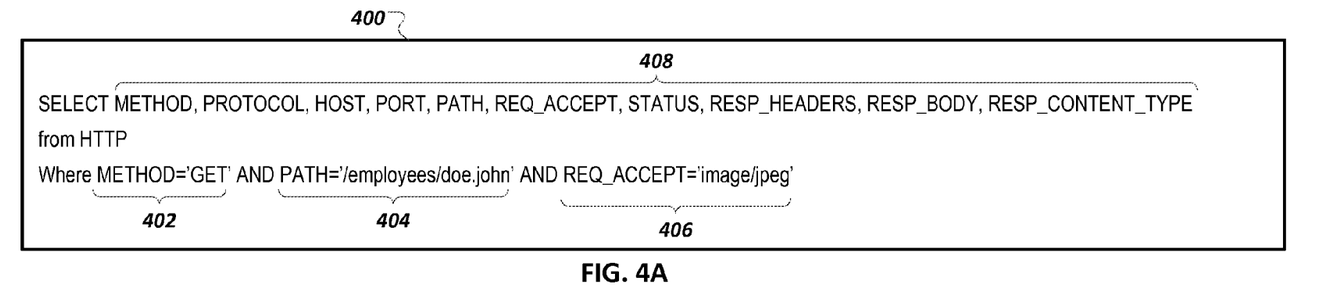
FIG. 4A illustrates an example SQL query provided to an ODBC driver.

FIG. 4A illustrates an example SQL query 400 provided to an ODBC driver. The example SQL query 400 can be provided, for example, to the ODBC driver, in association with an ODBC connection. The SQL query 400 includes a first predicate 402, a second predicate 404, and a third predicate 406. The first predicate 402 is used to specify a value of "GET" for a METHOD HTTP request parameter. The second predicate 404 is used to specify a value of "/employees/doe.john" for a PATH HTTP request parameter. The third predicate 406 is used to specify a value of "image/jpeg" for a REQUEST_ACCEPT HTTP request parameter. The REQUEST_ACCEPT request parameter can be used to specify one or more content types that are acceptable for an HTTP response received in response to a submitted HTTP request. The value of "image/jpeg" indicates that an acceptable content type for the HTTP response is image data in a JPEG format. The SQL query 400 may be used, for example, to request image data associated with an image of an employee.

Figure 4B:
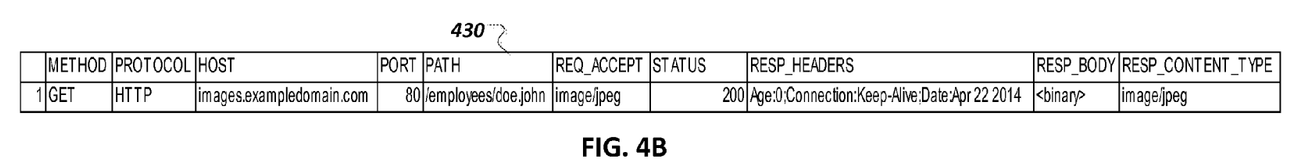
FIG. 4B illustrates an example query result set.

The SQL query 400 includes a column list 408. The column list 408 includes columns that are to be included in a query result set table (e.g., a table 430 as shown in FIG. 4B) that is to be populated with information from an HTTP response received by the ODBC driver in response to the HTTP request. The column list 408 includes METHOD, PROTOCOL, HOST, PORT, PATH, REQ_ACCEPT, STATUS, RESP_HEADERS, RESP_BODY, and RESP_CONTENT_TYPE columns.

The ODBC driver can generate an HTTP request based on the SQL query 400, submit the HTTP request to an external service using connection parameters associated with the ODBC connection, and receive an HTTP response from the external service. The ODBC driver can populate a query result set table based on the received HTTP response and provide the query result set table to the provider of the SQL query 400.

FIG. 4B illustrates an example query result set table 430. The query result set table 430 includes METHOD, PROTOCOL, HOST, PORT, PATH, REQ_ACCEPT, STATUS, RESP_HEADERS, RESP_BODY, and RESP_CONTENT_TYPE columns which correspond to the columns included in the column list 408 of the SQL query 400. The columns in the query result set table 430 can be a subset of columns (e.g., some or all of the columns) included in a predefined table. The ODBC driver can populate the query result set table by mapping information included in an HTTP response to the columns included in the query result set table 430. For example, the ODBC driver can add a first row (e.g., row "1") to the query result set table 430 and can populate each cell of the first row using information from the HTTP response that corresponds to the column associated with the cell.

For example, the first row includes values of "GET" for the METHOD column, "HTTP" for the PROTOCOL column, "images.exampledomain.com" for the HOST column, "80" for the PORT column, "/employees/doe.john" for the PATH column, "image/jpeg" for the REQ_ACCEPT column, "200" for the STATUS column, "Age: 0; Connection: Keep Alive; Date: Apr. 22, 2014" for the RESP_HEADERS column, "<binary>" (e.g., binary image data) for the RESP_BODY column, and "image/jpeg" for the RESP_CONTENT_TYPE column.

The query result set table 430 can be provided to the provider of the SQL query 400, in response to the SQL query 400. The provider of the SQL query 400 can use data in the query result set table 430 for further processing. In some implementations, the provider of the SQL query 400 adds some or all of the data in the query result set table 430 to a database system. In some implementations, a nested query is used to insert data from a query result set table into a database system. For example, a query similar to the SQL query 400 can be nested within another query, as described below.

Figure 4C:
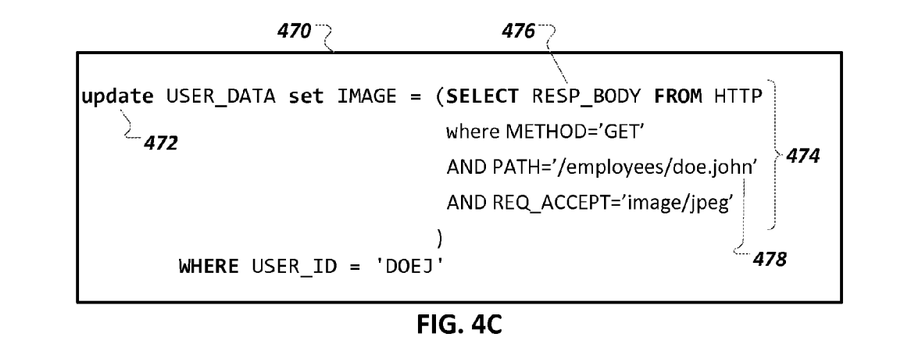
FIG. 4C illustrates an example nested SQL query for inserting data into a database system.

FIG. 4C illustrates an example nested SQL query 470 for inserting data into a database system. The nested SQL query 470 includes an outer UPDATE query 472 and an inner SQL query 474. The inner SQL query 474 is the same as the SQL query 400 except that the SQL query 474 includes only a RESP_BODY column 476 in the column list of the SQL query 474. The inner SQL query 474 is configured, for example, to request image data for an employee image.

Similar to the SQL query 400 described above, an ODBC driver can translate the inner SQL query 474 into an HTTP request. The inner SQL query 474 includes a PATH='/employees/doe.john' predicate 478 which can be used for configuring a URL for the HTTP request. The ODBC driver can submit the HTTP request to an external service and receive an HTTP response from the external service. The HTTP response can include binary image data associated with employee "John Doe". For example, the external service can be configured to retrieve image data based on a received HTTP request parameter corresponding to the predicate 478. The ODBC driver can generate a query result set table (not shown) that includes the binary image data in a RESP_BODY column. The query result set table generated by the ODBC driver can be returned by the ODBC driver as a query result of the inner SQL query 474. The outer UPDATE query 472 is configured to set an IMAGE value to the result of the inner SQL query 474 for a row in a USER_DATA table that has a USER_ID value equal to 'DOEJ'.

Figure 5:
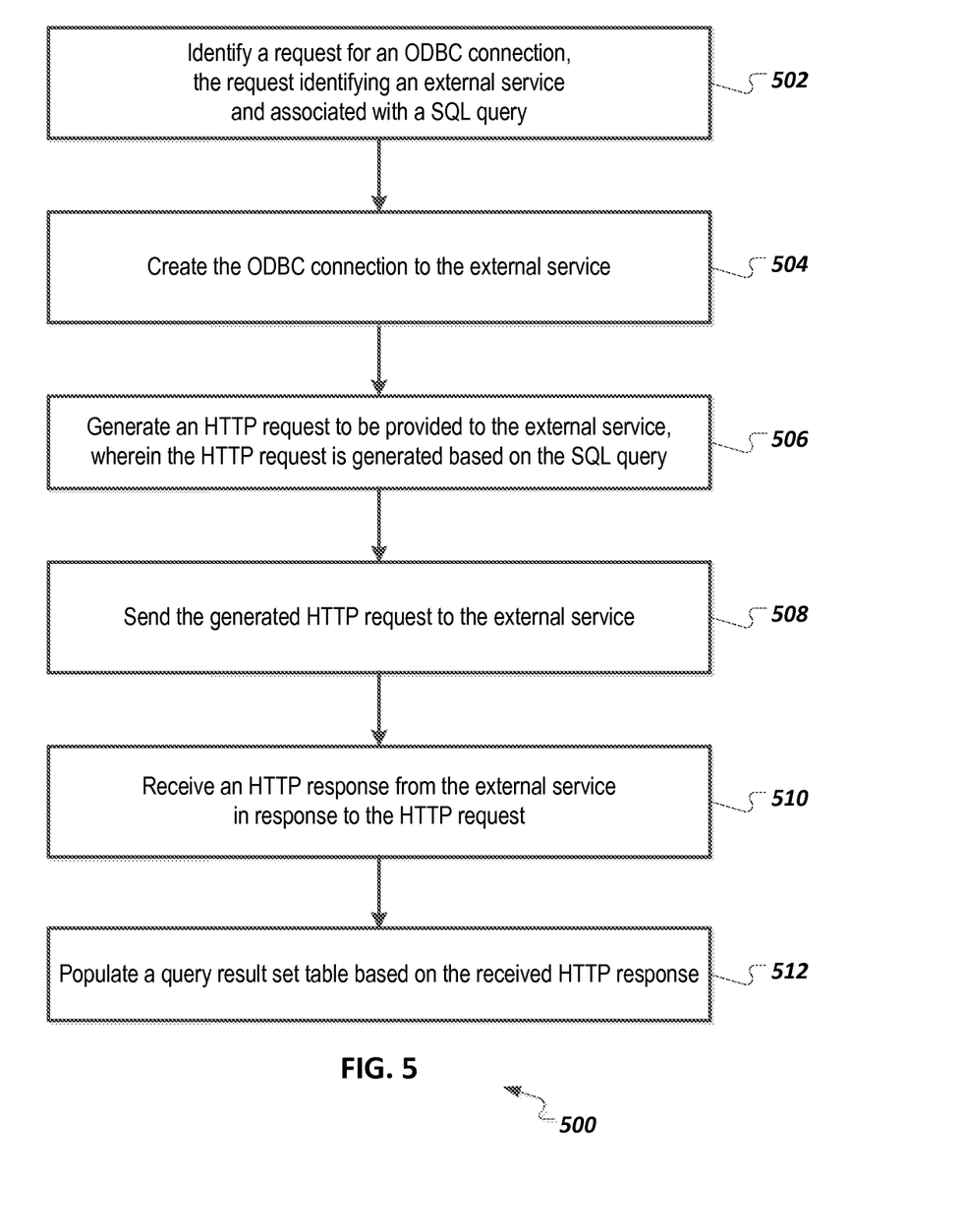
FIG. 5 is a flowchart of an example method for providing access to an external service using a SQL query.

FIG. 5 is a flowchart of an example method 500 for providing access to an external service using a SQL query. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by the ODBC driver 122 of FIG. 1.

At 502, a request for an ODBC connection is identified. The request identifies an external service and is associated with a SQL query. The external service can be, for example, a web service. In some implementations, the SQL query is included in the request for the ODBC connection. In some implementations, the SQL query is identified in a second request that is received after the request for the ODBC connection. The request for the ODBC connection can include a connection string including one or more connection parameters for connecting to the external service. The connection string can include a URL of the external service and authentication information for accessing the external service.

In some implementations, the request for the ODBC connection is received from a client computing device. The client computing device can, for example, generate the SQL query and associate the SQL query with the request for the ODBC connection. In some implementations, the SQL query is generated in response to a trigger event associated with a database system. The trigger event can occur, for example, in response to a new entry being added to the database system, a modification of an entry in the database system, or a deletion of an entry in the database system.

At 504, the ODBC connection is created. In some implementations, an ODBC connection object is returned to the requester of the ODBC connection. In implementations in which the SQL query is received in a second request, the SQL query can be received with a previously provided connection object.

At 506, an HTTP request to be provided to the external service is generated based on the SQL query. The generated HTTP request can also be based on the one or more connection parameters associated with the connection string. Generating the HTTP request can include specifying one or more request parameters for the HTTP request. HTTP request parameters to specify and parameter values to use for the specified HTTP request parameters can be determined by evaluating a WHERE clause of the SQL query. The WHERE clause of the SQL query can include one or more predicates that can be used to specify HTTP request parameters and provide values for those parameters. For example, each predicate can include a predefined column of a predefined table, an operator, and a request parameter value. Each predefined column of the predefined table that is included in the WHERE clause can correspond to an HTTP request parameter. For example, in some implementations, the predefined columns of the predefined table that can be included in the WHERE clause include METHOD, PATH, QUERY, REQ_HEADERS, REQ_BODY, REQ_CONTENT_TYPE, REQ_CONTENT_ENCODING, REQ_COOKIE, AND REQ_ACCEPT.

An example predicate is "METHOD='GET'". A predicate that includes the METHOD column can be used to set an HTTP method of the request to GET, PUT, POST, and DELETE, to name a few examples. A predicate that includes the QUERY column can be used to specify one or more values to be provided to the external service for one or more external service parameters. The REQ_ACCEPT column can be used in a predicate to specify acceptable types of data that can be returned in an HTTP response. Acceptable types can include, for example, various text and media data types.

At 508, the generated HTTP request is sent to the external service. The HTTP request can be sent, for example, using the HTTP protocol. At 510, an HTTP response is received from the external service in response to the HTTP request. The HTTP response can be received, for example, using the HTTP protocol.

At 512, a query result set table is populated based on the received HTTP response. The query result set table can be a runtime construct stored in memory. Populating the query result set table can include mapping information included in the HTTP response (or in some implementations, to information included in the HTTP request) to one or more columns included in the query result set table. Each of the one or more columns included in the query result set table can correspond both to a predefined column in the predefined table and to a column included in a column list included in the SQL query. Each column included in the query result set table can correspond to an HTTP request parameter or an HTTP response parameter. The query result set table can be provided to the requester of the ODBC connection.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method of providing access to an external service, comprising:
   identifying a request for an ODBC (Open DataBase Connectivity) connection, the request identifying the external service;
   creating the ODBC connection;
   receiving a SQL (Structured Query Language) query that is associated with the ODBC connection and includes information to be provided to the external service;
   translating the received SQL query into an HTTP (Hyper Text Transfer Protocol) request to be provided to the external service, wherein translating the SQL query into the HTTP request comprises identifying information in one or more predicates included in a WHERE clause of the SQL query, wherein each of the one or more predicates includes a predefined column of a predefined table, an operator, and a request parameter value, each predefined column in the predefined table corresponds to either an HTTP request parameter or an HTTP response parameter, and each column included in the SQL query corresponds to a predefined column included in the predefined table;
   sending the translated HTTP request to the external service;
   receiving an HTTP response from the external service in response to the HTTP request;
   translating the received HTTP response into a query result set table; and
   providing the query result set table in response to the received SQL query.

2. The method of claim 1, further comprising storing data in the query result set table to a database system.

3. The method of claim 1, wherein the SQL query is generated in response to a trigger event associated with a database system and the trigger event occurs in response to a new entry being added to the database system, a modification of an entry in the database system, or a deletion of an entry in the database system.

4. The method of claim 1, wherein the request for the ODBC connection includes the SQL query and a connection string including one or more connection parameters for connecting to the external service, the connection parameters include a URL (Uniform Resource Locator) of the external service and authentication information for accessing the external service, and the translated HTTP request is based on the one or more connection parameters.

5. The method of claim 1, wherein translating the HTTP response into the query result set table comprises mapping information included in the HTTP response to one or more columns included in the query result set table, wherein each of the one or more columns included in the query result set table corresponds to a predefined column in the predefined table and to a column included in a column list included in the SQL query.

6. The method of claim 1, wherein the query result set table is a runtime construct initially stored in memory.

7. A system comprising:
   one or more computers; and
   a non-transitory computer-readable medium coupled to the one or more computers having instructions stored thereon which, when executed by the one or more computers, cause the one or more computers to perform operations comprising:
      identifying a request for an ODBC (Open DataBase Connectivity) connection, the request identifying the external service;
      creating the ODBC connection;
      receiving a SQL (Structured Query Language) query that is associated with the ODBC connection and includes information to be provided to the external service;
      translating the received SQL query into an HTTP (Hyper Text Transfer Protocol) request to be provided to the external service, wherein translating the SQL query into the HTTP request comprises identifying information in one or more predicates included in a WHERE clause of the SQL query, wherein each of the one or more predicates includes a predefined column of a predefined table, an operator, and a request parameter value, each predefined column in the predefined table corresponds to either an HTTP request parameter or an HTTP response parameter, and each column included in the SQL query corresponds to a predefined column included in the predefined table;
      sending the translated HTTP request to the external service;
      receiving an HTTP response from the external service in response to the HTTP request;
      translating the received HTTP response into a query result set table; and
      providing the query result set table in response to the received SQL query.

8. The system of claim 7, the operations further comprising storing data in the query result set table to a database system.

9. The system of claim 7, wherein the SQL query is generated in response to a trigger event associated with a database system and the trigger event occurs in response to a new entry being added to the database system, a modification of an entry in the database system, or a deletion of an entry in the database system.

10. The system of claim 7, wherein the request for the ODBC connection includes the SQL query and a connection string including one or more connection parameters for connecting to the external service, the connection parameters include a URL (Uniform Resource Locator) of the external service and authentication information for accessing the external service, and the translated HTTP request is based on the one or more connection parameters.

11. The system of claim 7, wherein translating the HTTP response into the query result set table comprises mapping information included in the HTTP response to one or more columns included in the query result set table, wherein each of the one or more columns included in the query result set table corresponds to a predefined column in the predefined table and to a column included in a column list included in the SQL query.

12. The system of claim 7, wherein the query result set table is a runtime construct initially stored in memory.

13. A computer program product encoded on a non-transitory storage medium, the product comprising non-transitory, computer readable instructions for causing one or more processors to perform operations comprising:
   identifying a request for an ODBC (Open DataBase Connectivity) connection, the request identifying the external service;
   creating the ODBC connection;
   receiving a SQL (Structured Query Language) query that is associated with the ODBC connection and includes information to be provided to the external service;
   translating the received SQL query into an HTTP (Hyper Text Transfer Protocol) request to be provided to the external service, wherein translating the SQL query into the HTTP request comprises identifying information in one or more predicates included in a WHERE clause of the SQL query, wherein each of the one or more predicates includes a predefined column of a predefined table, an operator, and a request parameter value, each predefined column in the predefined table corresponds to either an HTTP request parameter or an HTTP response parameter, and each column included in the column list included in the SQL query corresponds to a predefined column included in the predefined table;

sending the translated HTTP request to the external service;

receiving an HTTP response from the external service in response to the HTTP request;

translating the received HTTP response into a query result set table; and providing the query result set table in response to the received SQL query.

14. The product of claim 13, wherein the SQL query is generated in response to a trigger event associated with a database system and the trigger event occurs in response to a new entry being added to the database system, a modification of an entry in the database system, or a deletion of an entry in the database system.

15. The product of claim 13, wherein the request for the ODBC connection includes the SQL query and a connection string including one or more connection parameters for connecting to the external service, the connection parameters include a URL (Uniform Resource Locator) of the external service and authentication information for accessing the external service, and the translated HTTP request is based on the one or more connection parameters.

16. The product of claim 13, wherein translating the HTTP response into the query result set table comprises mapping information included in the HTTP response to one or more columns included in the query result set table, wherein each of the one or more columns included in the query result set table corresponds to a predefined column in the predefined table and to a column included in a column list included in the SQL query.

17. The product of claim 13, wherein the query result set table is a runtime construct initially stored in memory.

* * * * *